United States Patent

[11] 3,601,658

| [72] | Inventor | Frank Manners<br>Basingstoke, England |
| --- | --- | --- |
| [21] | Appl. No. | 837,567 |
| [22] | Filed | June 30, 1969 |
| [45] | Patented | Aug. 24, 1971 |
| [73] | Assignee | Lansing Bagnall Limited<br>Basingstoke, Hampshire, England |
| [32] | Priority | July 1, 1968 |
| [33] | | Great Britain |
| [31] | | 31386/68 |

[54] CONTROL SYSTEMS INCLUDING A SAFETY CIRCUIT FOR DIRECT CURRENT ELECTRIC MOTORS
11 Claims, 2 Drawing Figs.

[52] U.S. Cl. .................................................. 317/16,
317/33 SC, 318/341, 318/345
[51] Int. Cl. .................................................. H02h 7/09,
H02p 7/28
[50] Field of Search ........................................ 318/341,
345, 356; 317/13, 33 R, 33 SC, 16

[56] References Cited
UNITED STATES PATENTS

| 3,359,457 | 12/1967 | King .............................. | 317/33 |
| --- | --- | --- | --- |
| 3,363,160 | 1/1968 | Morris ........................... | 318/341 |
| 3,389,318 | 6/1968 | Hoyt, Jr. ........................ | 318/345 |

Primary Examiner—Oris. L. Rader
Assistant Examiner—H. Huberfeld
Attorney—Martin Kirkpatrick ABSTRACT: The invention concerns a pulse-controlled DC motor having a main thyristor coupled in a commutating circuit with an auxiliary thyristor and triggered from a speed control using feedback from the armature. A transistor switch is coupled across a trigger network for the auxiliary thyristor and is rendered conductive when the main thyristor is fired. This inhibits the commutating operation and enables the periods of energization of the motor to be modulated.

A safety circuit including a contactor having an operating coil coupled effectively in parallel with the main thyristor cuts off the motor if the energization period is too long.

Fig. 2.

CONTROL SYSTEMS INCLUDING A SAFETY CIRCUIT FOR DIRECT CURRENT ELECTRIC MOTORS

BACKGROUND OF THE INVENTION

This invention relates to control systems for direct current electric motors. In particular, the invention relates to the type of control system wherein the direct current electric motor is intermittently energized by pulses of current. For this purpose, it is usual to use a controllable rectifier which is rendered intermittently conductive and which when in a conductive state permits current to flow to energize the motor.

It has been proposed to inhibit the application of trigger signals to the controllable rectifier if the armature current is above a predetermined level by means of an adjustable control which responds to the armature current of the motor for this purpose. In this way, a smooth regulation of the speed of the motor can be achieved as well as a reduction in excessive armature current levels, transient signals or unwanted drain on the power source, which for this type of system is commonly an electrical storage battery. By adjusting the control the predetermined level may be altered so as to vary the speed of, or power fed to, the motor.

However, with this type of proposed system, the duration of the periods of conduction of the controllable rectifier is constant; it is conventional to provide means for extinguishing the conduction of the controllable rectifier. Typically the extinguishing means are operated alternately with the rendering of the controllable rectifier conductive. The most usual arrangement is the well known "commutating" arrangement in which a capacitor is coupled between two controllable rectifiers which are triggered alternately by "on" and "off" pulses produced alternately by an appropriate pulse generator.

SUMMARY OF THE INVENTION

The present invention is directed to an improved form of control system which provides the inhibition of trigger signals in the manner described and in which as the rate at which trigger pulses fed to the controllable rectifier increases the duration of the conduction periods is also increased. This "pulse width modulation" provides, in practice, a more efficient, and wider range of, control of the direct current motor.

According to one aspect of the invention, a control system for a direct current electric motor comprises a controllable rectifier which on receipt of a trigger signal is rendered conductive and permits current to flow to energize the motor, extinguishing means operative on receipt of a further signal to render the controllable rectifier nonconductive, means for generating trigger signals and further signals alternately, adjustable control means responsive to the armature current of the motor to inhibit the application of trigger signals to the controllable rectifier if the armature current is above a predetermined adjustable level, and means responsive to the passage of a trigger signal to the controllable rectifier to prevent the operation of the extinguishing means at least in respect of the next succeeding further signal.

With the present invention, if a trigger signal causes the controllable rectifier to conduct, the next succeeding "further" signal is prevented from causing the termination of the conduction of the controllable rectifier. Accordingly, the conduction of the controllable rectifier lasts for a longer period than it would otherwise. If in fact the armature current is still below the predetermined level, the period of conduction of the controllable rectifier is continuous between successive trigger signals. The much greater variation in the average flow of energy to the motor that can be achieved by the modulation of the pulse width extends the control that can be exerted over the speed of the motor as well as reducing the number of transient signals (associated with high frequency pulses) flowing in the armature circuit.

It would be usual for a battery to be provided for energizing the motor.

It will be understood that the term "controllable rectifier" in this specification refers to the type of controllable rectifier whose period of conduction cannot be stopped merely by the termination of a trigger signal at its trigger input or gate. It is convenient for the controllable rectifier to comprise a thyristor; the most convenient arrangement is that the thyristor be arranged in series with the armature of the motor.

The aforementioned control means may comprise a saturable reactor, a conductor through which armature current from the motor can flow so as to produce magnetic flux in the reactor, a winding disposed on the reactor and as a shunt network between the means for generating and the controllable rectifier. With this arrangement a relatively high armature current saturates the reactor so that the electrical impedance presented by the aforementioned winding is low. A low impedance shunt in the path of the signals from the means for generating to the controllable rectifier effectively prevents the trigger signals from reaching the controllable rectifier. In order to vary the level of armature current necessary to produce saturation (and thereby to vary the current-speed characteristic of the motor) there may be means for producing flux in the reactor additional to that produced by the aforementioned conductor. The additional flux may be additive or subtractive with respect to the flux produced by the armature current. Conveniently the means for producing additional flux comprises a movable permanent magnet disposed adjacent the saturable reactor or in its magnetic circuit.

The means responsive to the passage of a trigger signal may take a variety of forms. Since the passage of a trigger signal to the controllable rectifier will be accompanied by a rise in potential of part of an electric circuit, this rise in potential may readily be used to control a gate or switch which operates to block or divert a further signal from the extinguishing means. A specific form of such an arrangement will be described in detail hereinafter.

The extinguishing means may comprise a further controllable rectifier coupled via a "commutating" capacitor to the aforementioned controllable rectifier and arranged such that a further signal renders the further controllable rectifier conductive and the aforementioned controllable rectifier nonconductive.

In another aspect, which may be considered either alone or in combination with the aspect considered above, the present invention is directed to a control system which includes an improved safety arrangement.

According to this aspect of the invention, a control system for a direct current electric motor comprises a controllable rectifier which on receipt of a trigger signal is rendered conductive and permits current to flow to energize the motor, a contactor of which a pair of contacts are operative to allow current flow in the motor when sufficient current flows through an operating coil, the operating coil being arranged to be energized in accord with the voltage across the controllable rectifier; and in which there are provided means responsive to the current through the operating coil to cause the conduction of the controllable rectifier to be terminated if the said current falls below a predetermined value.

Normally the periods of conduction of the controllable rectifier would be short, so that the inevitable decay of current in the coil does not lower the current to the predetermined level; an unduly long period of conduction will be accompanied by a decay of the current to below the predetermined level and the automatic termination of the conduction of the controllable rectifier.

Conveniently a resistor is arranged in series with the coil and means are responsive to the voltage developed across it by the coil's current to prevent the passage of a trigger signal to the controllable rectifier if this voltage is relatively low. This would be particularly useful in combination with the aspect of the invention described above; accordingly means may be provided to inhibit the response of an extinguishing means for the conduction of the controllable rectifier to 'further signals,' generated alternately with the said trigger signals, if a trigger signal passes to the controllable rectifier.

BRIEF DESCRIPTION OF THE DRAWINGS

FIGS. 1 and 2 show different parts of a control system constructed in accord with the invention.

DESCRIPTION OF THE PREFERRED EMBODIMENT

Figure 1:
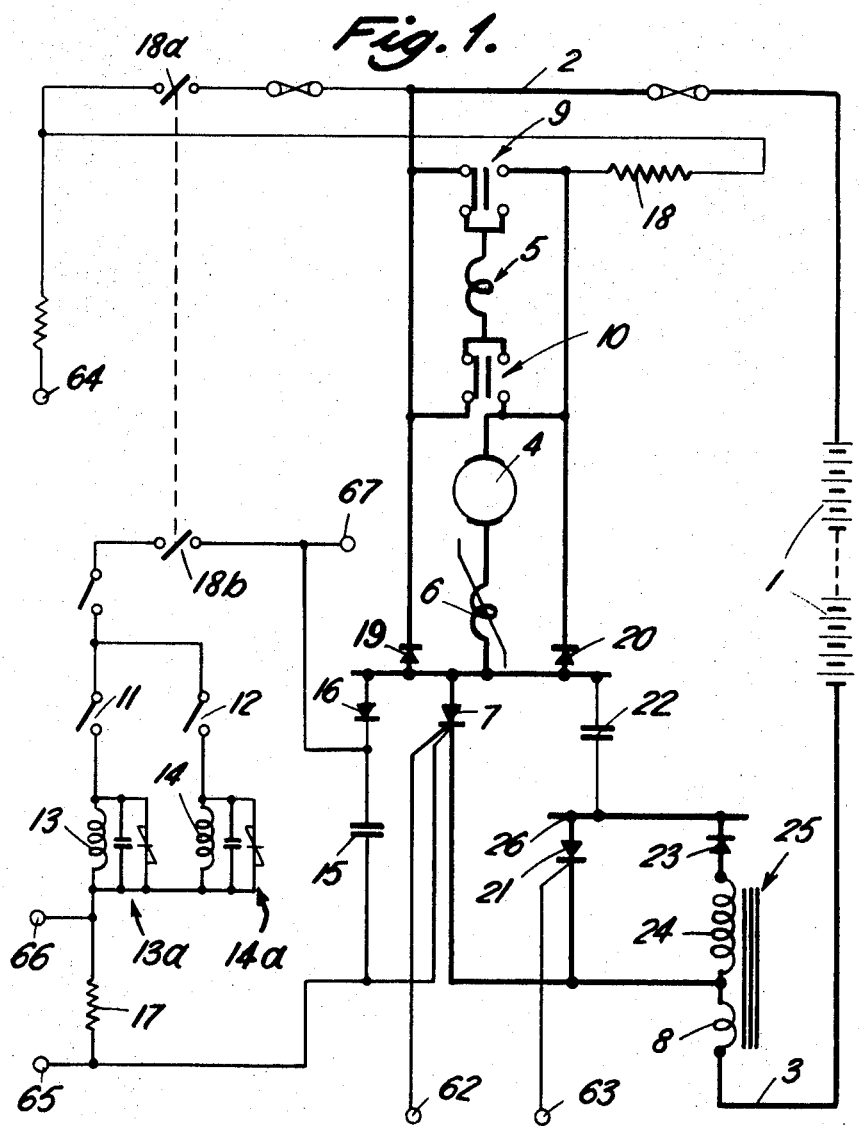

In FIG. 1 is shown a battery 1 of which the positive terminal is connected to a positive line 2 and of which the negative terminal is connected to a negative line 3. A series wound motor having an armature 4 and a field winding 5 is arranged in series with a single turn winding 6, a thyristor 7 and a primary transformer winding 8 between the lines 2 and 3. Two contactors have contact assemblies 9 and 10 and are arranged for directing the current flow through the motor circuit. As may be seen from the drawing, if both contactors are energized or deenergized, (as shown) no current flows through the motor: the rotation of the armature depends on which single contactor is energized, by the closure of one or other of two switches 11 and 12.

Whichever contactor is selected, its coil (13 or 14) is energized effectively in parallel with the thyristor 7: in fact, in parallel with a capacitor 15 which is coupled to the cathode of the thyristor 7 and to the cathode of a diode 16 of which the anode is connected to the anode of the thyristor 7. Thus, the coil 13 or 14 is fully energized only when the thyristor 7 is nonconductive.

Figure 2:
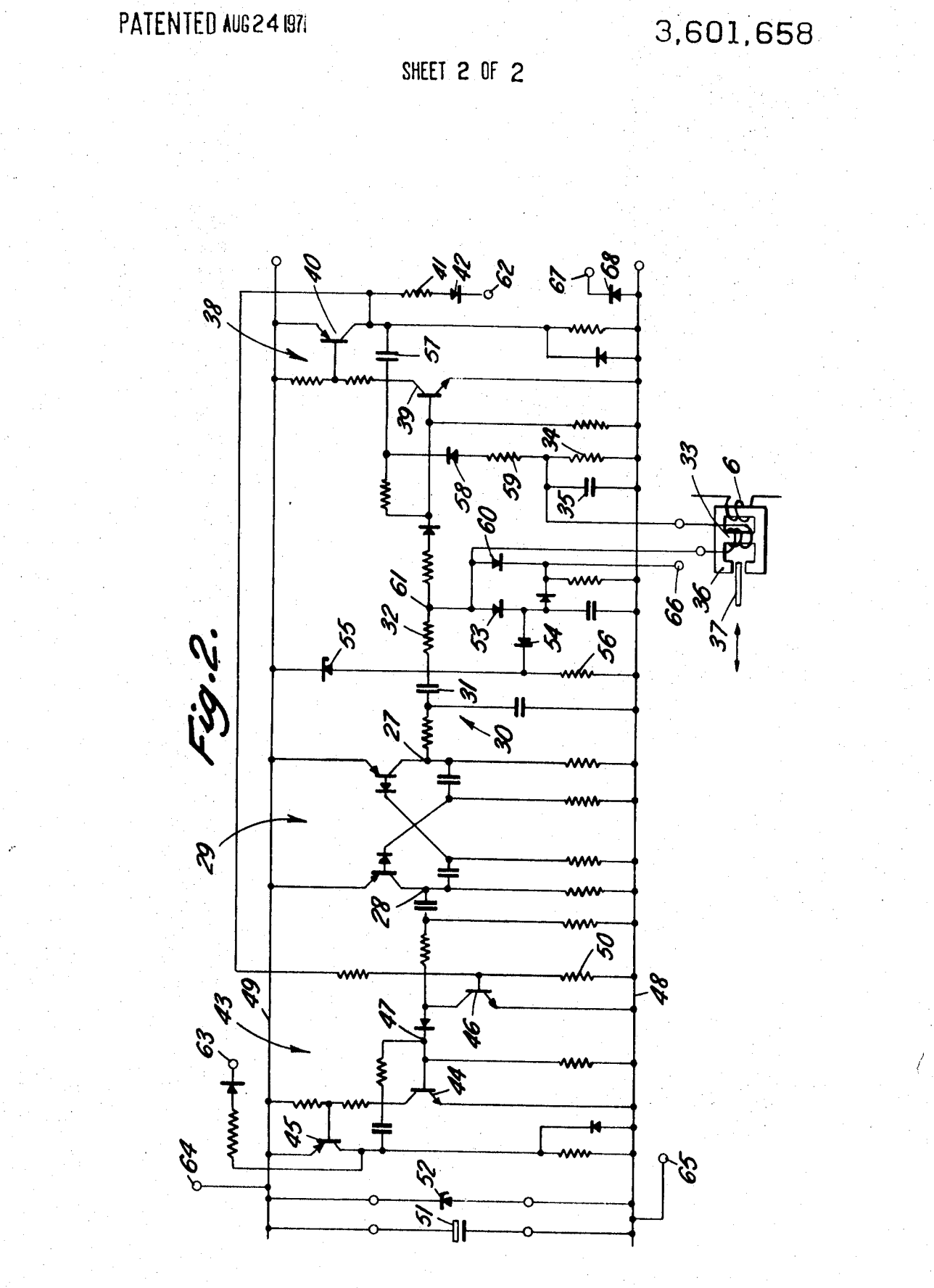

If the thyristor is rendered conductive, the current through the coil 13 or 14 decays: normally the thyristor would again be rendered nonconductive after a short time. If not, the voltage developed across a resistor 17 falls below a predetermined value: this, as explained hereinafter will cause the conduction of the thyristor to cease. The rate of decay is rendered fairly slow by the respective holding circuits 13a or 14a and by a freewheeling diode 68 (FIG. 2).

The motor may be started by the closure of the contacts 18a, 18b of a key switch to cause current flow through a latching resistor 18, the armature and the diode 16 and the coil 13, 14 (according to which switch 11 or 12 is closed). Two freewheeling diodes 19 and 20 are disposed in current paths including the motor to enable current to flow in the motor circuit during periods when the motor is not energized by the battery 1.

When the thyristor 7 is rendered conductive, current flows in the motor circuit until the thyristor is rendered nonconductive. The aforementioned extinguishing means comprises a known arrangement including an auxiliary thyristor 21 of which the anode is coupled to the anode of the thyristor 7 by a "commutating" capacitor 22. The anode of the auxiliary thyristor 21 is coupled through a diode 23 and the secondary winding 24 of the transformer 25, of which the winding 8 is the primary, to the negative line 3.

When the main thyristor 7 is rendered conductive, the auxiliary thyristor 21 is rendered nonconductive and the capacitor 22 acquires a corresponding voltage which is increased by the action of the transformer 25 in response to a current pulse through its primary winding 8: the charge on the plates of the capacitor is trapped by the diode 23. When the auxiliary thyristor 21 is rendered conductive, the large fall in the potential of its anode 26 is communicated by the capacitor 22 to the anode of the main thyristor 7, which is thereupon rendered nonconductive. A converse operation occurs when the main thyristor 7 is rendered nonconductive.

As will be explained, the application of a "trigger" signal to the thyristor 7 to render it conductive inhibits the application of a "further" signal which would render the thyristor 21 conductive.

In FIG. 2 is shown the remainder of the control system for the motor.

"Trigger" signals and "further" signals are constituted by alternately occurring, positive going pulses at the outputs 27 and 28 of an astable multivibrator 29. The multivibrator is asymmetrical; the positive pulses at the output 27 are very much shorter than those at the output 28: the ration may be of the order of 1:8. The output 27 leads via an RC smoothing network 30 and a capacitor 31 to a resistor 32 which forms one element of a potential dividing network which includes also a winding 33 and a resistor 34, which latter resistor is shunted by a capacitor 35. The winding 33 is wound on one limb of a saturable reactor 36 on another limb of which is disposed the single-turn winding 6. When the reactor 36 is saturated, the impedance of the winding 33 is low and the passage of trigger signals beyond the potential dividing network to the main thyristor is inhibited. The level of armature current required to produce saturation may be varied by adjusting the position of a movable permanent magnet 37 in the magnetic circuit of the reactor 36.

If the impedance of the winding 33 is relatively high, a positive pulse from the output 27 can pass to a trigger network 38 comprising two transistors 39 and 40: the collector of the second transistor 40 is coupled to the control gate of the thyristor 7 via a resistor 41 and a diode 42. The thyristor is rendered conductive by means of a firing pulse, which is generated in response to the leading edge of the respective positive pulse from the astable multivibrator, and which is longer than the said positive pulse by virtue of positive feedback through a capacitor 57.

Positive pulses at the output 28 are fed to a trigger network 43 formed principally by the two transistors 44 and 45, the collector of the transistor 45 being coupled to the control gate of the auxiliary thyristor 21. Firing pulses are generated in response to the leading edges of the respective positive pulses from the output 28. However, the pulses from the output 28 can be shunted from the trigger network 43 if a control transistor 46 is rendered conductive. The control transistor 46 has its collector coupled to the input 47 of the trigger network 43, its emitter connected to a negative line 48 (which with a positive line 49 provides voltage for the network of FIG. 2) and its base connected via a resistor 50 to the negative line and connected to the collector of the transistor 40.

Accordingly, when the main thyristor 7 is rendered conductive, so is the transistor 46 and the application of the next succeeding "further signal" to the trigger network 43 (and hence to the auxiliary transistor 21) is prevented; a firing pulse for the thyristor 7 still exists and the transistor 46 is still conductive, at the time when the firing pulse for the thyristor 21 would otherwise be generated.

A capacitor 51 and a zener diode 52 regulate the voltage between the lines 48 and 49. If for any reason this voltage should fall too low, trigger signals from the output 27 are prevented from reaching the trigger network 38, since they are shunted off via diodes 53, 54 of which the diode 54 is coupled to the junction of a zener diode 55 and a resistor 56, the latter diode and resistor being coupled across the lines 48 and 49. This avoids damage to the main thyristor 7 (or firing of the thyristor 7 without firing of the thyristor 21 since the two thyristors have, in general, different characteristics) by preventing the passage of trigger pulses of too low a power.

Negative feedback is applied from the collector of the transistor 40 via a capacitor 57, a diode 58 and a resistor 59; the capacitor 35 is charged in response, which effectively increases the inductance of the winding 33.

The feedback is proportional to the rate of transmission of trigger pulses: for a given setting of the magnet 37, the feedback increases in accord with the power input to the motor. This facilitates the use of a smaller thyristor for a given power output and provides a greater degree of control over the motor.

The resistor 17 is coupled through a diode 60 to the right hand end 61 of the resistor 32: thus, if the voltage across the resistor is too low, the end 61 will be at too low a potential for the network 38 to be triggered: accordingly the next "further" signal will not be inhibited and the thyristor 7 will be rendered conductive.

The functions of the undescribed passive components will be readily apparent.

The circuit of FIG. 2 is coupled to that of FIG. 1 via the shared points 62, 63, 64, 65, 66 and 67.

I claim:

1. A control system for a direct current electric motor comprising a controllable rectifier which on receipt of a trigger signal is rendered conductive and permits current to flow to energize the motor, extinguishing means operative on receipt of a further signal to render the controllable rectifier nonconductive, means for repetitively generating trigger signals and further signals alternately, adjustable control means responsive to the armature current of the motor to inhibit the application of trigger signals to the controllable rectifier if the armature current is above a predetermined adjustable level and controllable switch means responsive to the passage of a trigger signal to the controllable rectifier to divert the next succeeding further signal from operating said extinguishing means.

2. In a control system for a direct current electric motor having armature and field, the combination comprising:
 a DC power source;
 a main controllable rectifier coupled as a power switch between the source and the motor said main controllable rectifier having a control gate for receipt of a trigger signal rendering the main controllable rectifier conductive;
 conduction extinguishing means having a control input and operative on receipt of a further signal at the control input to extinguish the conduction of said main controllable rectifier;
 pulse generator means coupled to said control gate of said main controllable rectifier and said control input, said pulse generator means providing trigger signals for said main controllable rectifier alternately with further signals for said conduction extinguishing means;
 adjustable control means having an input coupled to sense current flowing in said armature for inhibiting the passage of a trigger signal to said main controllable rectifier if the armature current exceeds a predetermined level; and
 inhibiting means for inhibiting the operation of said conduction extinguishing means in response to the passage of a trigger signal to said main controllable rectifier; said inhibiting means comprising controllable switch means operative to divert from the conduction extinguishing means the next further signal after the last mentioned trigger signal.

3. The combination set forth in claim 2 in which the conduction extinguishing means comprises an auxiliary controllable rectifier including said control input, said auxiliary controllable rectifier being rendered conductive by said further signal at said control input, and a commutating capacitor coupling the said controllable rectifiers.

4. The combination set forth in claim 2 in which said pulse generating means provides said trigger signals and said further signals at a regular rate.

5. In a control system for a direct current electric motor having armature and field, the combination comprising:
 a DC power source;
 a main controllable rectifier coupled as a power switch between the source and the motor, said main controllable rectifier having a control gate for receipt of a trigger signal rendering the main controllable rectifier conductive;
 conduction extinguishing means having a control input and operative on receipt of a further signal at the control input to extinguish the conduction of said main controllable rectifier;
 pulse generator means coupled to said control gate of said main controllable rectifier and said control input, said pulse generator means providing trigger signals for said main controllable rectifier alternately with further signals for said conduction extinguishing means;
 adjustable control means having an input coupled to sense current flowing in said armature for inhibiting the passage of a trigger signal to said main controllable rectifier if the armature current exceeds a predetermined level, the adjustable control means comprising a saturable reactor, a conductor coupled to said armature and the saturable reactor whereby armature current flows through said conductor and produces magnetic flux in the reactor, a winding disposed on the reactor and arranged as a shunt network between the pulse generating means and the main controllable rectifier, and means for producing additional flux in said saturable reactor; and inhibiting means for inhibiting the operation of said conduction extinguishing means in response to the passage of a trigger signal to said main controllable rectifier.

6. The combination set forth in claim 5 further comprising feedback means responsive to the rate of transmission of the trigger signals to said main controllable rectifier, a capacitor is circuit with said winding whereby the charging of said capacitor effectively increases the inductance of said winding, said feedback means being coupled to said capacitor to charge same in accord with said rate of transmission.

7. In a control system for a direct current electric motor having armature and field, the combination comprising:
 a DC power source;
 a main controllable rectifier coupled as a power switch between the source and the motor, said main controllable rectifier having a control gate for receipt of a trigger signal rendering the main controllable rectifier conductive;
 conduction extinguishing means having a control input and operative on receipt of a further signal at the control input to extinguish the conduction of said main controllable rectifier;
 controllable switch means operative to divert a said further signal from said conduction inhibiting means, pulse generator means coupled to said control gate of said main controllable rectifier and said control input, said pulse generator means providing trigger signals for said main controllable rectifier alternately with further signals for said conduction extinguishing means;
 adjustable control means having an input coupled to sense current flowing in said armature for inhibiting the passage of a trigger signal to said main controllable rectifier if the armature current exceeds a predetermined level; and inhibiting means for inhibiting the operation of said conduction extinguishing means in response to the passage of a trigger signal to said main controllable rectifier, said inhibiting means including the said controllable switch means and including also pulse lengthening means responsive to a trigger signal and providing on receipt thereof a longer signal to control said controllable switch means.

8. In a control system for a direct current electric motor having armature and field, the combination comprising:
 A DC power source;
 a main controllable rectifier coupled as a power switch between the source and the motor, said main controllable rectifier having a control gate for receipt of a trigger signal rendering the main controllable rectifier conductive;
 conduction extinguishing means having a control input and operative on receipt of a further signal at the control input to extinguish the conduction of said main controllable rectifier;
 pulse generator means coupled to said control gate of said main controllable rectifier and said control input, said pulse generator means providing trigger signals for said main controllable rectifier alternately with further signals for said conduction extinguishing means;
 adjustable control means having an input coupled to sense current flowing in said armature for inhibiting the passage of a trigger signal to said main controllable rectifier if the armature current exceeds a predetermined level;
 inhibiting means for inhibiting the operation of said conduction extinguishing means in response to the passage of a trigger signal to said main controllable rectifier;
 a contactor having a pair of contacts and an operating coil for said contacts;

means for energizing said coil in accord with a voltage across said main controllable rectifier, said pair of contacts being operative to allow energization of said motor when said coil is energized;

sensing means for current in said coil; and means coupled to said sensing means for terminating the conduction of said main controllable rectifier when said current in said coil falls below a predetermined value.

9. In a control system for an electric motor the combination comprising:

a DC power source;

a main controllable rectifier coupled as a power switch between the source and the motor, said main controllable rectifier having a control gate for receipt of a trigger signal rendering said main controllable rectifier conductive; means for feeding trigger signals to said control gate of said main controllable rectifier;

a contactor having a pair of contacts and an operating coil for said contact;

means for energizing said coil in accord with a voltage across said main controllable rectifier, said pair of contacts being operative to allow energization of said motor when said coil is energized; sensing means for current flowing in said coil; and further means coupled to said sensing means for terminating the conduction of said main controllable rectifier when the current in said coil falls below a predetermined value.

10. The combination set forth in claim 9 in which the means for sensing comprises a resistor coupled in series with the coil for developing a voltage in accord with current through the coil, the further means being coupled to said resistor to respond to the voltage across the resistor, and coupled for inhibiting the passage of a trigger signal to the main controllable rectifier.

11. In a control system for a direct current electric motor having armature and field, the combination comprising an electric storage battery;

a main controllable rectifier coupled as a power switch between the battery and the motor, said main controllable rectifier having a control gate for receipt of a first firing pulse for rendering the main controllable rectifier conductive; an auxiliary controllable rectifier having a control input for receipt of a second firing pulse for rendering the auxiliary controllable rectifier conductive; a commutating capacitor coupling said controllable rectifiers whereby the conduction of each controllable rectifier extinguishes the conduction of the other controllable rectifier; a first trigger network, coupled between said adjustable control means and said control gate of the main controllable rectifier, for developing a first firing pulse in response to a trigger signal; a second trigger network for developing a second firing pulse in response to a further signal; pulse generator means for feeding trigger signals and further signals alternately to the first and second trigger networks respectively; controllable switch means for inhibiting operation of said second trigger network, said controllable switch means having a control input coupled to said first trigger network for responding to a first firing pulse developed thereat; and adjustable control means having an input coupled to sense current flowing in said armature for inhibiting the operation of said first trigger network if the armature current exceeds a predetermined level.